(12) United States Patent
Blanchard et al.

(10) Patent No.: US 12,391,630 B2
(45) Date of Patent: Aug. 19, 2025

(54) FERTILIZER POUCH

(71) Applicant: SYNGENTA CROP PROTECTION AG, Basel (CH)

(72) Inventors: Matthew Blanchard, Gilroy, CA (US); James Lloyd Gibson, Gilroy, CA (US)

(73) Assignee: Syngenta Crop Protection AG, Basel (CH)

( * ) Notice: Subject to any disclaimer, the term of this patent is extended or adjusted under 35 U.S.C. 154(b) by 1015 days.

(21) Appl. No.: 17/266,677

(22) PCT Filed: Aug. 20, 2019

(86) PCT No.: PCT/US2019/047140
§ 371 (c)(1),
(2) Date: Feb. 8, 2021

(87) PCT Pub. No.: WO2020/046623
PCT Pub. Date: Mar. 5, 2020

(65) Prior Publication Data
US 2021/0300837 A1    Sep. 30, 2021

Related U.S. Application Data

(60) Provisional application No. 62/723,084, filed on Aug. 27, 2018.

(51) Int. Cl.
*C05G 5/40* (2020.01)
*C05G 5/00* (2020.01)

(52) U.S. Cl.
CPC ...................... *C05G 5/45* (2020.02)

(58) Field of Classification Search
CPC ....................................... C05G 5/45
See application file for complete search history.

(56) References Cited

U.S. PATENT DOCUMENTS

| | | |
|---|---|---|
| 9,394,092 B2 | 7/2016 | Lee et al. |
| 2017/0275212 A1 | 9/2017 | Forte et al. |

FOREIGN PATENT DOCUMENTS

| | | | | |
|---|---|---|---|---|
| CN | 1363628 A | | 8/2002 | |
| CN | 103283721 A | | 9/2013 | |
| CN | 20323673 U | * | 10/2013 | ............. A01C 21/00 |
| CN | 203233673 U | | 10/2013 | |
| CN | 106428952 B | * | 8/2018 | ............... C05G 1/00 |

OTHER PUBLICATIONS

International Search Report for International Application No. PCT/US19/47140 mailed Nov. 20, 2019.
Wikipedia "Leaching (agriculture)", Mar. 21, 2018; retreived on Oct. 15, 2019 from https://en.wikipedia.org/w/index.php?title=Leaching_(agriculture)&oldid-8131589449, entire document, especially p. 1, paragraph 1.
Extended European Search Report for EP Application No. 19854575.8 mailed Apr. 21, 2022.

\* cited by examiner

*Primary Examiner* — Wayne A Langel
(74) *Attorney, Agent, or Firm* — Dale Skalla

(57) ABSTRACT

The present invention relates to methods and compositions for a fertilizer pouch comprised of hot water soluble polyvinyl alcohol. Methods and compositions for reducing leached nutrients are also provided including but not limited to: Iron, Manganese, Copper, Bicarbonate, Zinc, Phosphorus, Molybdenum, Ammonia, Nitrogen, Calcium, Potassium, Sulfate, Magnesium, Sodium, Chloride, Inorganic Nitrogen, and Total Nitrogen. Further, methods and compositions for treating a plant are provided.

7 Claims, No Drawings

FERTILIZER POUCH

CROSS-REFERENCE TO RELATED APPLICATIONS

This application is a 371 of International Application No. PCT/US2019/047140, filed Aug. 20, 2019, which claims priority to U.S. Application No. 62/723,084, filed Aug. 27, 2018, the contents of which are incorporated by reference herein.

BACKGROUND

Fertilizers have been used for many years to supplement nutrients in plant growing media. Optimal nutrition often ends after a plant is sold. A fertilizer pouch with a slow release of fertilizer provides a solution to give the consumer an additional period of plant nutrition. Decreased fertilizer release rate also protects plants against high salt which is measured as electrical conductivity in the soil. Polyvinyl alcohol pods which dissolve above 40 degrees Celsius do not dissolve when placed in the soil during plant growth, but surprisingly nutrients from the fertilizer escape from the intact pods albeit at a slower rate. This slow rate of fertilizer release can be advantageous for plant growth. Fertilizer pouches made with polyvinyl alcohol film which dissolves in hot water can be used in agriculture to decrease the release rate of controlled release fertilizers into the soil to a level which allows the plants to take up the nutrients before they are leached from the soil.

SUMMARY

Some embodiments provides a plant fertilization pouch comprising a fertilizer composition comprising controlled release fertilizer; and a hot water soluble pouch encapsulating said fertilizer composition. In further embodiments, the hot water soluble pouch may be comprised of polyvinyl alcohol film. The hot water soluble pouch may dissolve at 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, or 80 degrees Celsius. The polyvinyl alcohol film may comprise 1.0-3.0 Mil hot water dissolving film.

Some embodiments provide a method of reducing leached nutrients comprised of the steps of packing fertilizer into hot-water dissolving PVA packs, adding fertilized pack of step to a potted plant; and watering the potted plant as necessary, wherein the amount of leached nutrients is reduced compared to fertilizer alone. In some embodiments the leached nutrients which are reduced by the hot water soluble polyvinyl alcohol pouch are Iron, Manganese, Copper, Bicarbonate, Zinc, Phosphorus, Molybdenum, Ammonia, Nitrogen, Calcium, Potassium, Sulfate, Magnesium, Sodium, Chloride, Inorganic Nitrogen, Nitrate (NO3-N), and Total Nitrogen. In some embodiments, hot water soluble fertilizer pouches are used to grow salt sensitive species such as begonia and impatiens. In other embodiments, hot water soluble fertilizer pouches provided during plant production ensure that plant nutrients are available after the plant is transplanted into the consumer's garden. In some embodiments, a method of forming a fertilizer product for prolonged fertilization of plants and having a reduced rate of fertilizer nutrient release is contemplated. In some embodiments, a method of fertilizing a salt-sensitive plant is contemplated. In some embodiments, a method of applying a specific dose of controlled release fertilizer is contemplated. In some embodiments, a method of treating a plant is provided comprising: placing a plant into a hole; placing into said hole, at least one water dissolvable pouch comprising polyvinyl alcohol, wherein said pouch forms an enclosed space and wherein the polyvinal alcohol is 50 μm gauge hot water (HW) soluble film, and watering said plant.

DETAILED DESCRIPTION

In recent years the art has focused on techniques to deliver controlled amounts of plant nutrients to the soil or other growing media. This has been done so that, on the one hand, the growing plants are not adversely deprived of nutrients and, on the other hand, an oversupply of nutrients is avoided. An oversupply of nutrients can result in toxicity to the plants or losses of nutrients from leaching. The resulting improvement in FUE (fertilizer use efficiency) can reduce the rate and the frequency of nutrient application.

U.S. Pat. No. 5,538,531 [Hudson et al. (Hudson)] provides a useful overview of methods of conveying controlled release properties to a particulate plant nutrient. Specifically, Hudson teaches a controlled release, particulate fertilizer product having a water soluble fertilizer central mass encased in a plurality of water insoluble, abrasion resistant coatings. At least one inner coating is a urethane reaction product derived from recited isocyanates and polyols. The outer coating is formed from an organic wax having a drop melting point in the range of from 50° C. to 120° C. The general teachings of Hudson and those of the Examples in Hudson make it clear that the Hudson process involves curing the urethane coating(s) around the particulate plant nutrient and, thereafter, applying to the cured urethane coating(s) the outer layer of organic wax.

It is also known in the art to pre-coat particulate plant nutrient with an organic wax or similar material as a means to regular or otherwise improve the surface of the particulate plant nutrient prior to coating thereof with the urethane forming reagents.

Despite these advances in the art, there is still room for improvement. Specifically, it would be desirable to have a controlled release fertilizer and process for production thereof which would allow for the ready customization of the release rate profile of a given particulate plant nutrient having applied thereto a given amount of urethane coating(s). It would also be desirable to be able to achieve a desirable release rate profile for a given particulate plant nutrient using significantly reduced amounts of coating materials. A pouch of slow release fertilizer can provide a gentle stream of nutrients which can be used by plants before it leaches out of the pot.

The hot water (HW) film does not dissolve and remains intact in the soil because pods are not exposed to 50° C. (158° F.) water temperatures. Unexpectedly, fertilizer contained in hot-water film pods did enter the soil although at a rate slower than from fertilizer prills alone. Fertilizer pods made with HW film can be used in agriculture to decrease the release rate of controlled release fertilizers into the soil.

The plant growing system of the invention comprises a controlled-release fertilizer (CRF). The CRF may include any coated fertilizer that comprises nitrogen, phosphorus, potassium, and/or micronutrients such as magnesium, sulfur, zinc, iron, copper. The CRF nutrient sources may be derived from urea, ammonium nitrate, ammonium sulfate, diammonium phosphate (DAP), monoammonium phosphate (MAP), calcium phosphate, potassium sulfate, potassium nitrate or combinations or derivatives thereof; and/or secondary nutrients such as calcium, magnesium, sulfur, micronutrients such as iron, copper, zinc, chloride, silica, manganese, boron, molybdenum or combinations thereof. The controlled-release fertilizer may release nutrients over a four, five, six, seven, eight, nine, ten, 11, 12-14, or 16-18 month time period.

The CRFs may include commercially available products such as Nutricote®; Osmocote®, Osmocote® Plus; Osmocote® Plus Hi Start; Osmocote® Mini; Osmocote® Exact; Harrell's Polyon® in any array of longevities, NPK content, and physical form (e.g., NPK+Micronutrients); Osmocote® Pro; Multicote®; Basacote®; Plantacote® NPK, Plantacote® Blends and Plantacote® Pluss; Trikote®; Duration®; ESN®; Nutralene®/isobutyldiurea (IBDU)/Nitroform® (slow release nitrogen sources to provide slow release nitrogen feeding).

Controlled-release fertilizers (CRF) are well known in the art. These fertilizers are coated with materials that release nutrients (e.g., nitrogen, phosphorus, potassium) into soil or media for a plant's benefit over time. For example, Osmocote® Plus is a CRF that releases nutrients over 3 to 14 month periods depending on factors including the amount of coating and prill size.

Plants vary in their fertility requirements for achieving optimal growth. Indeed, plants may be characterized as light feeders (e.g., Begonias, *Impatiens*), medium feeders (e.g., Petunias, Geraniums), or heavy feeders (e.g., Poinsettias). Each class of feeders may tolerate varying, levels of salt, measured as electrical conductivity (EC): light feeders (EC"0.76 to 2 mS/cm), medium feeders (EC"1.5 to 3.0 mS/cm), and heavy feeders (EC"2.0 to 3.5 mS/cm) using the saturated media extract (SME) procedure. See Cavins et al., "Monitoring and Managing pH and EC Using the PourThru Extraction Method," Horticulture Information Leaflet 590, July 2000. High EC is detrimental to plants and is associated with poor shoot and root growth.

In one class of embodiments, the water-soluble film includes polyvinyl alcohol, PVOH. PVOH is a synthetic resin generally prepared by the alcoholysis, usually termed hydrolysis or saponification, of polyvinyl acetate. Fully hydrolyzed PVOH, wherein virtually all the acetate groups have been converted to alcohol groups, is a strongly hydrogen-bonded, highly crystalline polymer which dissolves only in hot water-greater than about 140° F. (60° C.). If a sufficient number of acetate groups are allowed to remain after the hydrolysis of polyvinyl acetate, the PVOH polymer then being known as partially hydrolyzed, it is more weakly hydrogen-bonded and less crystalline and is soluble in cold water—less than about 50° F. (10° C.). An intermediate cold/hot water soluble film can include, for example, intermediate partially-hydrolyzed PVOH (e.g., with degrees of hydrolysis of about 94% to about 98%), and is readily soluble only in warm water—e.g., rapid dissolution at temperatures of about 40° C. and greater. Both fully and partially hydrolyzed PVOH types are commonly referred to as PVOH homopolymers although the partially hydrolyzed type is technically a vinyl alcohol-vinyl acetate copolymer. The thickness films can be measured in millimeters and inches. The term "mil" is not an abbreviation but a unit of measure. Mil, also known as a thou, is equal to one thousandth of an inch (0.001 inch). The mil or thou is used in the United States to measure thickness of various materials. The thickness of films can also be measured in GAUGE (micron) also expressed as μm. Examples include films of 30, 40, 50, 60, 70, 80, and 90 microns thickness.

The degree of hydrolysis of the PVOH included in the water-soluble films of the present disclosure can be about 75% to about 99%, for example. As the degree of hydrolysis is reduced, a film made from the resin will have reduced mechanical strength but faster solubility at temperatures below about 20° C. As the degree of hydrolysis increases, a film made from the resin will tend to be mechanically stronger and the thermoformability will tend to decrease. The degree of hydrolysis of the PVOH can be chosen such that the water-solubility of the resin is temperature dependent, and thus the solubility of a film made from the resin, and additional ingredients is also influenced. In one class of embodiments the film is cold water-soluble. A cold water-soluble film, soluble in water at a temperature of less than 10° C., can include PVOH with a degree of hydrolysis in a range of about 75% to about 90%, or in a range of about 80% to about 90%, or in a range of about 85% to about 90%. In another class of embodiments the film is hot water-soluble. A hot water-soluble film, soluble in water at a temperature of at least about 60° C., can include PVOH with a degree of hydrolysis of at least about 98%.

Common methods for sealing water-soluble films formed into packets or pouches include heat sealing and solution sealing. With heat sealing, pouches may be formed by placing two sheets of water-soluble film together, heat-sealing three edges, filling with a suitable composition, and then heat sealing the forth edge to form a sealed pouch. In a solution sealing process, solvent is applied to the film material to form a seal between the solvated film and another film. Water is a common solvent for solution sealing of water-soluble pouches because it is low cost, non-toxic, and readily available such that, when applied at appropriate levels, it can result in strong seals which prevent solid/liquid leakage from the resulting pouch.

As an environmental issue, too much nitrogen and phosphorus in the water can have diverse and far-reaching impacts on public health, the environment and the economy.

The degradable package can advantageously be any two dimensional shape that is designed to hold dry ingredients when in three dimensional form. The degradable package can also be any size. Preferably, the shape is rectangular. Preferably, the size will result in an interior volume of about 1 gram to about 300 grams, and most preferably about 12 grams. The fertilizer can comprise any combination of nutrients, such as, nitrogen, potassium, phosphorous, soda ash, and magnesium. Preferably, the fertilizer is a combination of nitrogen, potassium, and phosphorous.

Some embodiments provides a plant fertilization pouch comprising a fertilizer composition comprising controlled release fertilizer; and a hot water soluble pouch encapsulating said fertilizer composition. In further embodiments, the hot water soluble pouch may be comprised of polyvinyl alcohol film. The hot water soluble pouch may dissolve at 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, or 80 degrees Celsius. The polyvinyl alcohol film may comprise 1.0-3.0 Mil hot water dissolving film.

Some embodiments provide a method of reducing leached nutrients comprised of the steps of packing fertilizer into hot-water dissolving PVA packs, adding fertilized pack of step to a potted plant; and watering the potted plant as necessary, wherein the amount of leached nutrients is reduced compared to fertilizer alone. In some embodiments the leached nutrients which are reduced by the hot water soluble polyvinyl alcohol pouch are Iron, Manganese, Copper, Bicarbonate, Zinc, Phosphorus, Molybdenum, Ammonia, Nitrogen, Calcium, Potassium, Sulfate, Magnesium, Sodium, Chloride, Inorganic Nitrogen, Nitrate (NO3-N), and Total Nitrogen.

In some embodiments, hot water soluble fertilizer pouches are used to grow salt sensitive species such as *begonia* and *impatiens*. In other embodiments, hot water soluble fertilizer pouches provided during plant production ensure that plant nutrients are available after the plant is transplanted into the consumer's garden. In some embodiments, a method of forming a fertilizer product for prolonged fertilization of plants and having a reduced rate of fertilizer nutrient release is contemplated. In some embodiments, a method of fertilizing a salt-sensitive plant is contemplated. In some embodiments, a method of applying a specific dose of controlled release fertilizer is contemplated. In some embodiments, a method of treating a plant is provided comprising: placing a plant into a hole; placing into said hole, at least one water dissolvable pouch comprising polyvinyl alcohol, wherein said pouch forms an enclosed space and wherein the polyvinyl alcohol is 50 µm gauge hot water (HW) soluble film, and watering said plant. In some embodiments, the polyvinyl alcohol hot water (HW) film does not dissolve and remains intact because pods were not exposed to 50° C. (158° F.) water temperatures yet the pod slowly releases nutrients.

EXAMPLES

Example 1

Example 1 shows the effects different temperature dependent water soluble PVA films on the release rate of fertilizer from the package. Packages measuring 5 to 8 cm length and 5 to 8 cm width and 1 to 3 cm height were made using either 50 µm gauge cold-water (CW) soluble PVA film (dissolving at a water temperature greater than 4° C.) or 30 to 50 µm gauge hot-water (HW) soluble film (dissolving at a water temperature greater than 50° C.). One CW film (supplied by MonoSol, LLC) was compared with two HW films (supplied by MonoSol, LLC and Aicello). Packages contained 12 grams of Harrell's Polyon® controlled-release fertilizer (NPK 16-6-13).

One fertilizer package for each film were placed in three replicate 532-mL cups filled with 350 mL of deionized water (29.1 g L$^{-1}$). The temperature of water inside cups remained at 18.8±1.8° C. throughout the experiment. Electrical conductivity and pH of the water was measured up to 3 times per week immediately following gentle swirling of the cup (Hanna Instruments, model HI 9813-6 conductivity meter with temperature compensation). A total of 28 measurements were recorded in each cup over 105 days.

Packages made with CW film dissolved within 30 seconds after immersion in water, leaving only the fertilizer behind. Packages made with HW film did not dissolve and remained fully intact during the experiment because pods were not exposed to hot water temperatures. Unexpectedly, pods made with HW film absorbed water into the package but the film limited the diffusion of fertilizer nutrients from inside to outside of the package. Throughout 10 weeks of the experiment, fertilizer enclosed in a HW package had on average 25% less nutrient release than packages made with CW film. The pH of the water was on average 14% (0.6 pH units) lower with HW film versus CW film. It took considerably longer for water inside the cups to increase to the same electrical conductivity level with fertilizer packages made with HW film versus CW; 5 days and 20 days longer to reach an EC of 6 and 10 mS/cm, respectively.

TABLE 1

| Days since start | Treatment and Electrical conductivity (mS/cm) | | | Treatment and pH | | |
|---|---|---|---|---|---|---|
| | Cold-water film package | Hot-water film package (MonoSol) | Hot-water film package (Aicello) | Cold-water film package | Hot-water film package (MonoSol) | Hot-water film package (Aicello) |
| 1 | 1.2 | 0.9 | 1.1 | 6.5 | 6.1 | 5.9 |
| 2 | 3.1 | 1.9 | 1.4 | 5.7 | 6.0 | 5.8 |
| 3 | 3.2 | 2.4 | 2.4 | 5.7 | 5.9 | 5.7 |
| 4 | 3.2 | 2.6 | 2.5 | 5.6 | 5.7 | 5.4 |
| 5 | 3.6 | 2.8 | 2.7 | 5.4 | 5.2 | 4.8 |
| 7 | 4.5 | 3.5 | 3.6 | 5.4 | 4.8 | 4.6 |
| 9 | 5.0 | 3.8 | 3.8 | 5.6 | 4.7 | 4.7 |
| 11 | 5.4 | 4.2 | 4.1 | 5.5 | 4.7 | 4.8 |
| 13 | 6.3 | 5.1 | 5.0 | 5.3 | 4.5 | 4.7 |
| 15 | 6.8 | 5.4 | 5.3 | 5.3 | 4.6 | 4.6 |
| 17 | 7.2 | 5.8 | 5.8 | 5.3 | 4.6 | 4.5 |
| 19 | 7.7 | 6.0 | 6.0 | 5.4 | 4.6 | 4.5 |
| 21 | 8.1 | 6.3 | 6.4 | 5.3 | 4.6 | 4.5 |
| 23 | 8.6 | 6.7 | 6.8 | 5.3 | 4.6 | 4.5 |
| 25 | 9.1 | 7.2 | 7.5 | 5.3 | 4.5 | 4.5 |
| 27 | 9.4 | 7.6 | 8.0 | 5.3 | 4.5 | 4.5 |
| 30 | 9.9 | 8.1 | 8.4 | 5.3 | 4.5 | 4.6 |
| 33 | 10.3 | 8.6 | 8.9 | 5.3 | 4.5 | 4.6 |
| 35 | 10.5 | 8.6 | 8.9 | 5.2 | 4.5 | 4.5 |
| 38 | 10.9 | 9.1 | 9.3 | 5.3 | 4.6 | 4.6 |
| 42 | 11.3 | 9.5 | 9.7 | 5.2 | 4.5 | 4.5 |
| 45 | 11.4 | 10.0 | 10.2 | 5.2 | 4.5 | 4.5 |
| 49 | 11.6 | 10.3 | 10.5 | 5.2 | 4.5 | 4.5 |
| 52 | 11.9 | 10.5 | 10.6 | 5.2 | 4.5 | 4.5 |
| 56 | 12.0 | 10.5 | 10.6 | 5.3 | 4.5 | 4.6 |
| 63 | 12.3 | 11.0 | 11.1 | 5.2 | 4.5 | 4.5 |
| 70 | 12.5 | 11.2 | 11.2 | 5.2 | 4.6 | 4.6 |
| 105 | 12.9 | 11.7 | 11.6 | 5.2 | 4.5 | 4.5 |
| Average | 8.2 | 6.8 | 6.9 | 5.4 | 4.8 | 4.7 |

Example 2

Example 2 shows the effects of fertilizer packages made with two different temperature dependent water soluble PVA films on the release rate of nutrients into the soil. Packages measuring 5 to 8 cm length and 5 to 8 cm width and 1 to 3 cm height were made using either 50 μm gauge cold-water (CW) soluble PVA film (dissolving at a water temperature greater than 4° C.) or 50 μm gauge hot-water (HW) soluble film (dissolving at a water temperature from greater than 50° C.). Both films were supplied by Monosol, LLC. Packages contained 11 grams of Nutricote® controlled-release fertilizer (NPK 18-6-8).

Two flowering annual garden varieties, namely Pansy Colossus Purple with Blotch and Snapdragon Snaptastic Magenta were used for this experiment. Plastic pots (950 ml) were filled with a standard commercial soilless peat-based medium (supplied by Berger, Watsonville, CA). Each pot was planted with one plug (288-cell tray size) in the center of the pot. At the time of planting, one fertilizer package per pot was dibbled into the soil between the edge of the pot and the plug. There were eight replicate pots per treatment and variety. Plants were irrigated with clear water throughout the experiment and no other fertilizer was applied. To quantify the nutrients released into the growing medium from the fertilizer package, vessels were placed under each pot to collect the effluent discharged over five weeks. Each week, water samples were submitted to a laboratory for complete nutrient analysis (Waypoint Analytical Labs, Memphis, TN).

Fertilizer packages made with HW film delayed the diffusion of nutrients from the package into the soil. Unexpectedly, plants grown with HW soluble film fertilizer packages had up to 53% lower concentrations of macro and micronutrients in the soil than fertilizer packages made with CW soluble film. The electrical conductivity in the soil was 11% lower with HW versus CW soluble film fertilizer packages. Interestingly, Boron was the only nutrient that had higher concentrations in the soil (42%) with HW versus CW soluble film fertilizer packages. Therefore, fertilizer packages made with HW soluble film delay the release of fertilizer into the soil reducing environmental pollution by decreasing nutrient effluent into the environment.

TABLE 2

| Nutrient | Cold-water film package (Average) | Hot-water film package (Average) | Difference (hot water vs cold water film) |
| --- | --- | --- | --- |
| Iron (ppm) | 1.02 | 0.58 | −45% |
| Manganese (ppm) | 1.03 | 0.61 | −41% |
| Copper (ppm) | 0.22 | 0.14 | −40% |
| Bicarbonate (ppm) | 33.42 | 24.64 | −27% |
| Zinc (ppm) | 0.94 | 0.72 | −18% |
| Phosphorus (ppm) | 24.75 | 20.07 | −15% |
| Molybdenum (ppm) | 0.07 | 0.06 | −12% |
| Ammonia Nitrogen (ppm) | 89.84 | 78.27 | −12% |
| Calcium (ppm) | 234.37 | 206.80 | −12% |
| Potassium (ppm) | 112.67 | 98.55 | −11% |
| Sulfate (ppm) | 375.60 | 334.43 | −11% |
| Magnesium (ppm) | 130.14 | 118.12 | −9% |
| Sodium (ppm) | 57.24 | 52.02 | −8% |
| Chloride (ppm) | 54.73 | 51.10 | −6% |
| Inorganic Nitrogen (ppm) | 326.77 | 315.67 | −4% |
| Total Nitrogen (ppm) | 341.97 | 334.20 | −3% |

TABLE 2-continued

| Nutrient | Cold-water film package (Average) | Hot-water film package (Average) | Difference (hot water vs cold water film) |
| --- | --- | --- | --- |
| Nitrate (NO3—N) (ppm) | 236.75 | 237.37 | −1% |
| Boron (ppm) | 0.31 | 0.43 | 42% |

TABLE 3

| Measurement | Cold-water film package (Average) | Hot-water film package (Average) | Difference (hot water vs cold water film) |
| --- | --- | --- | --- |
| Electrical conductivity (mS/cm) | 3.5 | 3.2 | −10% |
| pH | 5.6 | 5.5 | −1% |

Example 3

Example 3 shows the effects of fertilizer packages made with two different temperature dependent water soluble PVA films on the release rate of nutrients into the soil and plant performance. Packages measuring 5 to 8 cm length and 5 to 8 cm width and 1 to 3 cm height were made using either 50 μm gauge cold-water (CW) soluble PVA film (dissolving at a water temperature greater than 4° C.) or 50 μm gauge hot-water (HW) soluble film (dissolving at a water temperature greater than 50° C.). Both films were supplied by Monosol, LLC. Packages contained 13 grams of Harrell's Polyon® controlled-release fertilizer (NPK 15-6-12)

Sixteen different varieties of flowering annual plants comprising genera of *Alyssum, Angelonia, Calibrachoa, Catharanthus, Euphorbia, Pelargonium, Impatiens, Lobularia, Pentas, Petunia*, and *Salvia* were used for this experiment. These varieties were selected because they represent a range of genera with diverse nutrient requirements for growth and development. For example, *petunia* has a high fertilization requirement while *begonia* as a low requirement and can be adversely affected by supra-optimal amounts of fertilizer in the growing medium (Kang and van Iersel, 2009). Plastic pots (950 ml volume) were filled with a standard commercial soilless peat-based medium (supplied by Berger, Watsonville, CA). Each pot was planted with one plug (50- to 288-cell tray size) in the center of the pot. At the time of planting, one fertilizer package per pot was dibbled into the soil between the edge of the pot and the plug. There were eight replicate pots per treatment and variety. Plants were irrigated with clear water throughout the experiment and no other fertilizer was applied. For eight different crops, the EC and pH of the growing media were measured weekly for 4 weeks using the pour thru method.

During 4 weeks of growing, plants with HW soluble film fertilizer packages had on average 12% lower EC than plants grown with fertilizer packages made with CW soluble film (Table 4). There was no difference in pH between treatments. The fertilizer film package type also affected plant growth. Soluble salt sensitive crops including *Calibrachoa* and *Begonia* were more compact when grown with a CW film package versus HW film. This is due to the higher EC of the growing media with CW film which can negatively inhibit plant growth.

Table 4 shows a comparison of electrical conductivity (mS/cm) of growing media for various crops grown with a fertilizer package made with either a cold-water (CW) soluble PVA film or hot-water (HW) soluble PVA film over 4 weeks of production.

TABLE 4

| Variety | Fertilizer film package | Day 7 | Day 14 | Day 21 | Day 28 | Average |
|---|---|---|---|---|---|---|
| Calibrachoa Callie Rose | Cold Water | 2.2 | 3.5 | 3.2 | 2.1 | 2.7 |
| Calibrachoa Callie Rose | Hot Water | 3.3 | 3.4 | 2.1 | 1.7 | 2.6 |
| Hot water vs. cold water film | Difference | 32% | −1% | −56% | −22% | −12% |
| Catharanthus Pacifica XP Punch | Cold Water | 2.6 | 4.1 | 3.6 | 2.7 | 3.3 |
| Catharanthus Pacifica XP Punch | Hot Water | 2.8 | 4.4 | 2.3 | 2.3 | 3 |
| Hot water vs. cold water film | Difference | 6% | 7% | −61% | −13% | −15% |
| Impatiens Accent Rose Star | Cold Water | 2.7 | 4 | 2.3 | 1.6 | 2.7 |
| Impatiens Accent Rose Star | Hot Water | 2.1 | 3.8 | 3.2 | 1.7 | 2.7 |
| Hot water vs. cold water film | Difference | −27% | −6% | 26% | 6% | 0% |
| New Guinea Impatiens Sonic Salmon | Cold Water | 2.8 | 2.1 | 2.7 | 3.1 | 2.7 |
| New Guinea Impatiens Sonic Salmon | Hot Water | 2.4 | 1.7 | 2.4 | 2.2 | 2.2 |
| Hot water vs. cold water film | Difference | −14% | −20% | −14% | −43% | −23% |
| Pelargonium Caliente Fire Imp. | Cold Water | 2.5 | 2.1 | 2.7 | 1.5 | 2.2 |
| Pelargonium Caliente Fire Imp. | Hot Water | 2.4 | 1.4 | 2.7 | 2 | 2.1 |
| Hot water vs. cold water film | Difference | 4% | −53% | 2% | 25% | −7% |
| Pelargonium Calliope Large Burgundy | Cold Water | 2.8 | 2.4 | 3.9 | 2.2 | 2.8 |
| Pelargonium Calliope Large Burgundy | Hot Water | 3.1 | 1.5 | 2.8 | 1.7 | 2.3 |
| Hot water vs. cold water film | Difference | 12% | −58% | −40% | −32% | −29% |
| Petunia Sanguna Patio Radiant Rose | Cold Water | 2.4 | 3.1 | 2.3 | 1.6 | 2.4 |
| Petunia Sanguna Patio Radiant Rose | Hot Water | 2.6 | 2.9 | 1.6 | 1.4 | 2.1 |
| Hot water vs. cold water film | Difference | 8% | −7% | −40% | −17% | −14% |
| Salvia Velocity Blue | Cold Water | 2.3 | 3.1 | 2.3 | 1.4 | 2.3 |
| Salvia Velocity Blue | Hot Water | 2.4 | 3.2 | 2.3 | 1.4 | 2.3 |
| Hot water vs. cold water film | Difference | 1% | 1% | 1% | 0% | 0% |

Example 4

Example 4 shows the effects of planting in the soil fertilizer packages made with 50 μm gauge hot-water (HW) soluble film (dissolving at a water temperature greater than 50° C.) on garden plants grown outside. Outdoor garden performance was compared after planting with HW soluble film packages versus three commercially available controlled-release fertilizer (CRF) products not packaged in water-soluble PVOH film.

HW soluble film packages measuring 5 to 8 cm length and 5 to 8 cm width and 1 to 3 cm height were made using film supplied by Monosol, LLC. Packages contained 13 grams of Harrell's Polyon® controlled-release fertilizer (NPK 15-6-12). The three commercially fertilizer products used for comparison testing included 7.5 grams of Osmocote® Pot-Shots™ Plant Food Nuggets (CRF 15-8-11; supplied by The Scotts Company LLC), 12 grams of Leonard Starter Tablets (CRF Dec. 17, 2017; supplied by A. M. Leonard, Inc.), and 13 grams of Osmocote® Smart-Release® Plant Food Plus (CRF 15-9-12; supplied by The Scotts Company LLC).

Six different varieties of flowering annual plants comprising genera of *Angelonia*, *Euphorbia*, *Lantana*, *Mandevilla*, *Pentas*, and *Scaevola* were used for this experiment. These varieties were selected because they represent a range of genera with diverse nutrient requirements for outdoor performance in the garden. They are also popular genera sold in the horticulture industry and planted in gardens.

All plants were first grown in climate-controlled greenhouses using traditional production protocols. Plastic pots (950 ml volume) were filled with a standard commercial soilless peat-based medium (supplied by Berger, Watsonville, CA). Each pot was planted with one plug (50- to 288-cell tray size) in the center of the pot and plants were fertilized at each irrigation with a standard liquid fertilizer. Plants were grown to market-ready flowering stage when they would typically be shipped to retail stores and purchased by consumers.

Plants were moved outdoors to begin the summer garden performance testing period. Market-ready plants of each variety were transplanted into 39 cm wide plastic patio pots (21.4 L volume) filled with a standard soilless peat-based medium. At the time of garden planting, one fertilizer package per pot or one commercial fertilizer product was dibbled into the soil adjacent to the plant. The treatment with Osmocote® Smart-Release® Plant Food Plus fertilizer was top dressed on the soil surface based on product label instructions. One treatment included a control with no controlled release fertilizer package or product.

There were three replicate pots per fertilizer treatment and variety (135 patio pots total). Plants were irrigated with clear water three times each week and no other fertilizer was applied. The experiment was performed Jul. 22 to Nov. 1, 2018 and under outside weather conditions of: 20.2° C. average daily temperature, 23.9° C. average day temperature, 15.5° C. average night temperature, 41.1 mols/day/square meter average daily light integral, and 55% relative humidity (WatchDog 2000 Series Weather Station, Spectrum Technologies, Aurora, IL).

After 4 months in the garden, the fresh weight of all plants was measured by cutting the above ground portion of the plant at the soil surface and immediately weighing the harvested tissue on a scale. Fresh weight is commonly used during experiments to measure the total yield or biomass of a plant after the growing season. Plants that were planted with HW soluble film fertilizer packages had on average 187% greater biomass than unfertilized control plants and 32% more biomass than plants planted with the three commercially available fertilizer products.

After 4 months in the garden, the total flower number was counted on *Angelonia, Mandevilla*, and *Pentas*. Plants grown with HW soluble film fertilizer packages had 111% more flowers versus unfertilized control plants and 36% more flowers than plants planted with the three commercially available fertilizer products.

Unexpectedly, plants grown with HW soluble film fertilizer packages grew larger and developed more flowers over the growing season than plants grown with Osmocote® Smart-Release® Plant Food Plus, even though both products contained the same grams of nitrogen per application. Therefore, fertilizer packages made with HW soluble film delay the release rate of fertilizers into the soil and improve fertilizer use efficiency.

Table 5 shows a comparison of plant biomass (grams fresh weight) after 4 months of growth in the garden for various crops planted with a HW film fertilizer package or commercially available fertilizer products.

TABLE 5

| Variety | Control (no fertilizer) | HW film fertilizer package | Osmocote® PotShots™ Plant Food Nuggets | Leonard Starter Tablets | Osmocote® Smart-Release® Plant Food Plus |
|---|---|---|---|---|---|
| Angelonia Carita ™ Purple | 184 | 424 | 281 | 395 | 337 |
| Lantana Bandana ® Peach | 70 | 174 | 134 | 124 | 142 |
| Euphorbia Euphoric ™ White | 60 | 351 | 252 | 378 | 324 |
| Mandevilla Mandinia ™ Deep Red | 68 | 264 | 154 | 197 | 169 |
| Pentas Starcluster ™ White | 150 | 403 | 285 | 388 | 230 |
| Scaevola Bombay ® White | 204 | 503 | 315 | 408 | 360 |
| Average | 123 | 353 | 237 | 315 | 260 |

Table 6 shows a comparison of flower number after 4 months of growth in the garden for various crops planted with a HW film fertilizer package or commercially available fertilizer products.

TABLE 6

| Variety | Control (no fertilizer) | HW film fertilizer package | Osmocote® PotShots™ Plant Food Nuggets | Leonard Starter Tablets | Osmocote® Smart-Release® Plant Food Plus |
|---|---|---|---|---|---|
| Angelonia Carita ™ Purple | 95 | 173 | 120 | 148 | 132 |
| Mandevilla Mandinia ™ Deep Red | 11 | 47 | 29 | 32 | 23 |
| Pentas Starcluster ™ White | 18 | 42 | 35 | 37 | 24 |
| Average | 124 | 262 | 184 | 218 | 179 |

What is claimed:

1. A plant fertilization pouch comprising:
   a) a fertilizer composition comprising controlled release fertilizer; and
   b) a hot water-soluble pouch encapsulating said fertilizer composition, wherein the hot water-soluble pouch dissolves in water only at 41 to 80 degrees Celsius.

2. The pouch of claim 1, wherein said hot water soluble pouch comprises polyvinyl alcohol film.

3. The pouch of claim 1, wherein the polyvinyl alcohol film is 50 μm gauge hot water (HW) soluble film.

4. The pouch of claim 1, wherein the polyvinyl alcohol film is selected from the group consisting of 1.0-3.0 Mil hot water soluble film.

5. A method of reducing leached nutrients:
   a) packing fertilizer into hot water-soluble PVA packs;
   b) adding the fertilizer pack of step a) to a potted plant; and
   c) watering the potted plant as necessary, wherein the amount of leached nutrients is reduced compared to fertilizer alone, wherein the hot water-soluble pouch dissolves in water only at 41 to 80 degrees Celsius.

6. The method of claim 5, wherein the leached nutrients which are reduced by the hot water-soluble polyvinyl alcohol pouch are selected from the group consisting of: Iron, Manganese, Copper, Bicarbonate, Zinc, Phosphorus, Molybdenum, Ammonia, Nitrogen, Calcium, Potassium, Sulfate, Magnesium, Sodium, Chloride, Inorganic Nitrogen, and Total Nitrogen.

7. A method of treating a plant comprising:
   (a) placing a plant into a hole;
   (b) placing into said hole, at least one polyvinyl alcohol pouch, wherein said pouch forms an enclosed space and wherein the polyvinal alcohol is 50 μm gauge hot water (HW) soluble film; and
   (c) watering said plant, wherein the hot water-soluble pouch dissolves in water only at 41 to 80 degrees Celsius.

* * * * *